US011762832B2

(12) United States Patent
Ofenloch

(10) Patent No.: US 11,762,832 B2
(45) Date of Patent: *Sep. 19, 2023

(54) CONTAINER STORAGE MANAGEMENT SYSTEM

(71) Applicant: SAP SE, Walldorf (DE)

(72) Inventor: Dominik Ofenloch, Lampertheim (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,742

(22) Filed: Mar. 3, 2022

(65) Prior Publication Data

US 2022/0188285 A1 Jun. 16, 2022

Related U.S. Application Data

(63) Continuation of application No. 16/856,233, filed on Apr. 23, 2020, now Pat. No. 11,386,062.

(51) Int. Cl.
*G06F 16/22* (2019.01)
*B65G 1/137* (2006.01)

(52) U.S. Cl.
CPC ........ *G06F 16/2282* (2019.01); *B65G 1/1371* (2013.01)

(58) Field of Classification Search
CPC .................................... G06F 16/2282
USPC ....................................... 707/741
See application file for complete search history.

(56) References Cited

U.S. PATENT DOCUMENTS

| | | | |
|---|---|---|---|
| 2009/0254883 A1* | 10/2009 | Munson | G06F 11/3624 717/124 |
| 2012/0016901 A1 | 1/2012 | Agarwal et al. | |
| 2013/0124466 A1* | 5/2013 | Naidu | G06F 16/27 707/610 |
| 2013/0339314 A1* | 12/2013 | Carpentier | G06F 3/0641 707/E17.005 |
| 2015/0205831 A1* | 7/2015 | Rundle | G06F 16/24 707/695 |

(Continued)

OTHER PUBLICATIONS

U.S. Appl. No. 16/871,251, Ofenloch, filed May 11, 2020.
Non-Final Office Action issued in United States U.S. Appl. No. 16/856,233 dated Nov. 10, 2021, 24 pages.

*Primary Examiner* — Muluemebet Gurmu
(74) *Attorney, Agent, or Firm* — Fish & Richardson P.C.

(57) ABSTRACT

The present disclosure relates to computer-implemented methods, software, and systems for generating a hierarchy of metadata tables for a database comprising containers including tables. The tables are identified by table names and assigned to containers. A first table is assigned to two containers and may define two table instances of the first table. The hierarchy of metadata tables includes a first metadata table defining mappings between container identifiers, table names, table sections, and unique identifiers for corresponding data within table sections of table instances defined with the table names mapped to the container identifiers. In response to receiving a request to generate a replication of table content, a second metadata table is generated to identify a unique set of table instances from the set of the containers based on evaluating the first metadata table. The unique set of table instances comprises data from the database storage without repetition.

19 Claims, 4 Drawing Sheets

(56) References Cited

U.S. PATENT DOCUMENTS

2016/0162207 A1\* 6/2016 Sharma ................ G06F 16/137
                                                      711/162
2021/0334258 A1 10/2021 Ofenloch
2022/0188285 A1\* 6/2022 Ofenloch ............ G06F 16/2282

\* cited by examiner

300

| CONTAINER_ID | TABNAME | SIZE_IN_KBYTES | NUMBER_OF_ROWS |
|---|---|---|---|
| BACKUP_OCTOBER | USR01 | 100 | 100,000 |
| BACKUP_NOVEMBER | USR01 | 100 | 100,000 |

350

| CONTAINER_ID | TABNAME | SLICE_ID | CHECKSUM |
|---|---|---|---|
| BACKUP_OCTOBER | USR01 | 1 | ABCDEF |
| BACKUP_NOVEMBER | USR01 | 1 | ABCDEF |

380

| TABNAME | CHECKSUM | NUMBER_OF_REFERENCES | DATA |
|---|---|---|---|
| USR01 | ABCDEF | 2 | <User Data> |

FIG. 3

CONTAINER STORAGE MANAGEMENT SYSTEM

CLAIM OF PRIORITY

This application claims priority under 35 USC § 120) to U.S. patent application Ser. No. 16/856,233, filed on Apr. 23, 2020, entitled "CONTAINER STORAGE MANAGEMENT SYSTEM"; the entire contents of which are hereby incorporated by reference.

TECHNICAL FIELD

The present disclosure relates to computer-implemented methods, software, and systems for database data processing in a platform environment.

BACKGROUND

Software complexity is increasing and causes changes in the software product cycles, requirements, and possibilities for delivery of software applications and platform systems. Customer's needs are being transformed to request flexibility in terms of processes, landscape, and software components. Development of new software applications often times relies on existing, previously developed functionality, or on integrations between software applications to perform more complex use cases. There are a number of scenarios where software components or entire databases that are provided for reuse by customers, partners, developers, consultants, or other end users. For example, software platforms may provide functionality and content that can be extended and therefore new application can be built on top of them.

Database tables may be used for storing data related to different scenarios. In some cases, database tables may be used and evaluated in different client scenarios. For example, for provisioning client environment, for configuring new client system, or for providing backup services. Different client environments may be configured to include default data provided by platform providers and may extend with additional customers data. A platform provider may maintain a database storage where data for different clients is stored, where the data may intersect when two or more of the client set-ups include common data.

SUMMARY

The present disclosure involves systems, software, and computer implemented methods for managing metadata for database tables organized in containers within a database storage.

One example method may include operations such as generating a hierarchy of metadata tables for a database comprising containers including data stored in tables, wherein the tables are identified by table names and assigned to a corresponding one or more containers, wherein a first table assigned to two containers defines two table instances of the first table storing different data in the two containers, wherein generating the hierarchy of metadata tables comprises generating a first metadata table defining mappings between container identifiers, table names, table sections, and unique identifiers for corresponding data within table sections of table instances defined with the table names mapped to the container identifiers; in response to receiving a request to generate a replication of table content from a set of the containers from the database, generating a second metadata table to identify a unique set of table instances from the set of the containers based on evaluating the first metadata table, wherein the unique set of table instances comprises data from the database storage without repetition; and based on evaluating the generated second metadata table, providing the unique set of table instances identified in the second metadata table for performing data replication.

Other implementations of this aspect include corresponding systems, apparatus, and computer programs, configured to perform the actions of the methods, encoded on computer storage devices.

Implementations can optionally include that generating the first metadata table includes: selecting a table instance associated with a container from the containers of the database; serializing table data from the table instance to calculate a checksum to uniquely identify a portion of the table data from the table instance; and defining the unique identifiers for the data corresponding to the table sections in accordance with calculated checksums.

In some instances, the implementations of the current disclosure may also include that generating the second metadata table includes: determining whether records in the second metadata table associated with same table names are mapped to the same unique identifiers for portions of the data corresponding to the table names; and determining that two table instances identified by a single table name include different data when determining two records in the second metadata table including different unique identifiers for at least one table section corresponding to the two table instances.

In some instances, generating the hierarchy of metadata tables may include: generating a third metadata table defining mappings between container identifiers and table names; and generating a fourth metadata table identifying quantity of tables and table size in relation to the containers.

In some instances, generating the second metadata table may include: storing records in the second metadata table defining mappings between a table name, a unique identifier for data content at a table instance with the table name, and a number of occurrences of the data content associated with the unique identifier, wherein the number of occurrences of the data content is determined within table instances at the set of the containers associated with the received request.

In some instances, a first record and a second record in the second metadata table identify a first table name for a table from the tables in the database, when table instances corresponding to the first table name include different data in different containers to which they are assigned, and wherein the first table name is stored in at least two records at the first metadata table including different unique identifiers.

In some instances, a received request to generate the replication of table content from the set of the containers from the database is in relation to a client identified with a client identifier, and wherein the second metadata table includes metadata for tables included in containers identified as associated with the client identifier.

In some instances, the first metadata table identifies a temporary table instance of the first table associated with a container for storing temporary data, wherein the first metadata table identifies one or more sections of the temporary table instance with global unique identifiers as unique identifiers, and wherein when the second metadata table is generated the temporary table instance is stored as a separate record to identify the temporary table instance without evaluating data from the first metadata table.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description, drawings, and claims.

DESCRIPTION OF DRAWINGS

FIG. 3 includes example block diagrams of metadata database tables in accordance with example implementations of the present disclosure.

DETAILED DESCRIPTION

Figure 1:
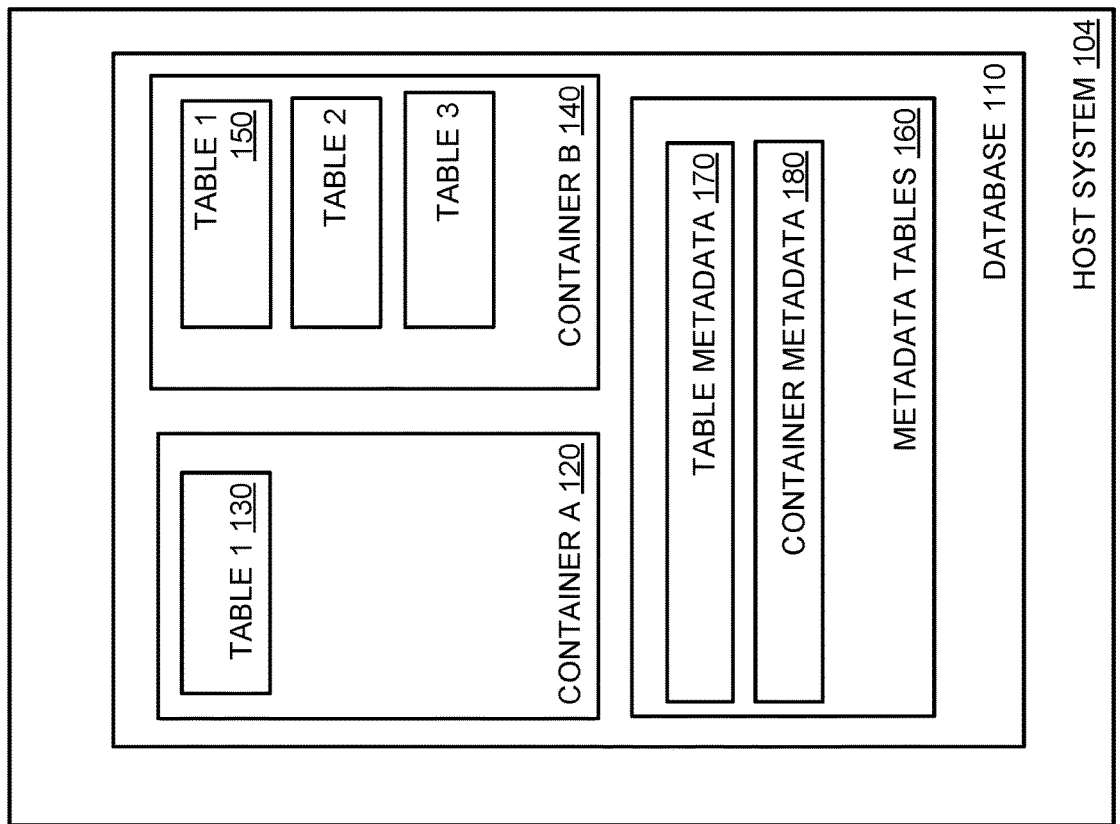
FIG. 1 illustrates an example computer system architecture that can be used to execute implementations of the present disclosure.

The present disclosure describes various tools and techniques for managing metadata for database tables organized in containers within a database storage.

A database storage may store contents that include more than hundreds of thousands of database tables in one place. The database storage may organize the database tables into containers, where the containers may be used in different configurations, landscape environments, and/or set-ups, for example, for a particular client, a client project, a product version, etc. The containers may be associated to different platform configurations, clients, product setups, software versions, etc. The storage is used to deliver new customizing configurations to customer cloud systems.

In some instances, the containers defined in the database storage may be assigned in sets to particular clients and/or projects. In some of those instances, the database tables from the storage can be assigned to unlimited number of containers. In such setups, individual database tables may be assigned as part of multiple containers. In some cases, database tables may be assigned to particular containers based on, at least in part, the table name. There may be occasions where two tables having the same name are assigned to two different containers, where those two tables include identical content. Additionally, there may be occasions where two tables that have the same name are assigned to two different containers and include different content from each other.

In some instances, tables of a database storage may be identified by table names and assigned to a corresponding one or more containers of multiple containers defined by container identifiers in a database storage. In some instances, the containers may be defined with different granularity and based on different criteria. The containers may be identified with unique identifiers within the set of containers in the database storage. For example, a first set of containers may be defined for a first client, where the first client is provided with the data in the database tables assigned to the first set of containers. Additionally, a second client may be provided or associated with a second set of containers that include some of the containers from the first set of containers for the first client. This may occur in particular scenarios, such as where the two clients are provided with default data that is stored in the common containers and specific client data that is stored in containers that are not shared between clients.

In some instances, a first table may be assigned to two containers and two table instances of the first table may be defined to store different data in the two containers. For example, when a container is defined and tables are allocated to a container, the tables are assigned by their name.

In some instances, when tables are assigned to containers, they may include initial pre-stored data or data corresponding to a previous client environment version. When tables are used and data is generated in productive scenarios, a table assigned to one container may be populated with data that is not relevant for the table with the same name assigned to a different container. In this manner, different table instances are created, where those different table instances are assigned to different containers, but are referred to by the same name.

In some instances, a hierarchy of metadata tables may be generated that comprises metadata tables identifying relationships between containers, table names, and table content. The hierarchy of metadata table may include container metadata defining relationships between containers identified by their unique identifier, associated client identifier for the container, and associated table names. The hierarchy of metadata tables may also include table metadata defining relationships between containers, portions of table data (identified by table names and portion identifiers), and unique identifiers calculated to uniquely correspond to the data within the portions of the table data. For example, table metadata may store records mapping a first container identifier, a table name, a first identifier of a first portion of the table (e.g. corresponding to a slice of the table equal to a default slice size), and a unique identifier for the data (e.g., a checksum). Based on this metadata, tables assigned to different containers but having different content may be identified.

In some instances, when a request to setup a new client system is received, a database storage including containers and correspondingly assigned tables may be evaluated based on a generated hierarchy of metadata tables to determine relevant data for the client's system. In some instances, the relevant data may be determined based on the containers that are associated with a particular client. Based on the evaluation of the table metadata, a unique set of table instances from containers associated with the client's system may be identified, where the unique set of table instances includes data without replication. For example, based on evaluation of the table metadata, a metadata table defining a set of tables identified by their name and assigned to the containers associated with the client's system may be defined that does not include two records that define tables which have the same name and include the same content. In particular, the table metadata may be evaluated by comparing records that refer to instances of tables with a common table name and then comparing the associated unique identifier for the portions of the content of the table instances. When two table instances assigned to two different containers are associated with the same unique identifier for the content of the table portions, a determination can be made that the two tables include the same content and the metadata table may be populated with just one record that refers to the table instances by the common table name. Further, the metadata table may identify a number of occurrences of table instances having the same content.

In some instances, a set of tables that are relevant for performing a copy from the database storage to the new client system environment may be defined based on the defined metadata table. Such a set, defining table instances that are unique within the containers relevant for the new client system, can provide operation efficiency for performing data replication in a client set-up scenario. For example, by identifying the unique set of table instances that needs to be replicated, which does not include duplicate tables, the copying and transferring of data from one storage to another is improved, and computing resources for transferring large data sets are reduced.

In another scenario, when a client system is requesting a data backup to be performed in relation to data stored in a database storage, the hierarchy of metadata tables may be used and evaluated to determine only the relevant set of tables that need to be copied, without the need to perform multiple replications of table instances including the same data content. Using the determination of relevant data for performing a backup is further supported by generating a metadata table that defines the unique set of tables for performing the back-up, where table instances having the same content are included as a single record in the metadata table, resulting in performance of only a single replication of the two table instances.

FIG. 1 depicts an example architecture 100 in accordance with implementations of the present disclosure. In the depicted example, the example architecture 100 includes a client device 102, a network 106, and a host system 104. The host system 104 includes one or more server devices and databases 108 (e.g., database 110). In the depicted example, a user 112 interacts with the client device 102.

In some examples, the client device 102 can communicate with the host system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the host system 104 includes at least one server and at least one data store (e.g., database 110). In the example of FIG. 1, the host system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the host system 104 can host a database 110. The database 110 may be a database storage maintained by a software service provider, a platform provider, or any other suitable provider or entity, where data is maintained (e.g., in relation to different customer landscapes, different clients, different products and product releases, etc.).

In some instances, the host system 104 may host the database 110 where data is organized in containers and tables are assigned to containers by at least referring to their table names. Tables may be organized into containers to support different customer scenarios and product deliveries. A first set of one or more containers may be associated with one client landscape or system and another set of containers may be associated with another client landscape or system. In some instances, the client systems may be associated with containers that have tables assigned to them, where those tables are defined with a common name.

In the illustrated implementation, database 110 includes container A 120 and container B 140, where both containers include a table with a common name, here, "Table 1." As illustrated, container A 120 includes a table instance 130 and container B 140 includes a table instance 150, each instance having the name Table 1. Container B 140 may include further tables, such as Table 2 and Table 3, which are not part of container A 120. The database 110 may further include other containers (not shown), including tables that may correspond to the names of the tables that are part of containers A and B.

In one example, container A 120 and container B 140 may be associated with a particular client X and in relation to a system Y. When the host system 104 receives a request to provision a new instance of the system Y for client X, the database 110 may generate a hierarchy of metadata tables 160 to identify data that is stored in the database. In the illustrated implementation, a table metadata 170 and a container metadata 180 tables are generated. These tables include metadata that defines mappings between containers, tables, and table content. For example, the container metadata 180 may include mappings between container identifiers, table names, size of tables associated with the corresponding table name in the corresponding container, etc. Further, the table metadata 170 may include mappings between container identifiers, table names, identifiers for portions of corresponding tables to the table names, and unique identifiers for the data content in the portions. In the current example, as tables may store huge amounts of data, tables may be divided or sliced into portions of a particular granularity and data portions may be characterized with a calculated unique identifier corresponding to the exact data content of the data portions.

In some instances, a database table storage system may serialize and store database table in generic containers. To avoid memory overflow, the stored database tables may be in slices. The size of each slice is calculated by a container storage method, that can be based for example on an average row-size of a table. To store the data as efficient as possible, a copy tool may use checksums for identifying slices keeping the same data and to store such slices only once.

In the presented example, the table metadata 170 and container metadata 180 may be evaluated in relation to the received request to provide a definition of tables for replication at a client's landscape for the provisioning of the new system. Provisioning of the new system Y may include replicating the data from the host system 104 that is relevant for the new system Y and transferring that data to another host system for the provisioning. When the request is received, the table metadata 170 may be created and evaluated to determine whether container(s) associated with the client X and the new system Y include instances of tables that include equivalent data. If such a determination is made by evaluating the generated metadata tables 160, then a smaller portion of the total data is required to be copied and transferred from one system to another. In doing so, provisioning of systems is improved as fewer resources are spent and operations are more efficient (e.g., a reduction in time for the data transfer).

When the hierarchy of metadata tables 160 is created for the database 110 for provisioning the new system Y for client X, the metadata tables 160 may be evaluated whether the two instances of the table with the name Table 1 (i.e., 130 and 150) are identical. That comparison and evaluation may be performed based on the table metadata 170. The table metadata 170 table may be a first metadata table generated as part of the hierarchy of metadata tables 160. The table metadata 180 may be stored in a table format with rows corresponding to records. In the table metadata 170, a first record may refer to container A 120 and "Table 1" instance 130, and a second record refers to container B 140 and "Table 1" instance 150. The first and the second record may be each associated with a unique identifier that uniquely identifies the content of the data in these table instances. For example, the unique identifier may be a checksum computed based on the content in each instance of the table. If the checksums are computed for the two table instances and are then identified by or associated with identical unique identifiers in the corresponding records in the table metadata, then a second metadata table may be generated, e.g. data metadata table. The second metadata table is a part of the hierarchy of metadata tables and can define a unique set of table names, where the table instances referred with these table names do not duplicate themselves.

For example, a second metadata table for system Y and client X may determine four table names relevant for the provisioning, as "Table 1" is defined by two instances that include equal data. The determination of whether the two instances include equivalent data may be performed by evaluating the computed unique identifiers for the respective two records stored in the table metadata. In doing so, the second metadata table may include a list including "Table 1", "Table 2", and "Table 3", where "Table 1" may be identified by attributes in the second metadata table as associated with two instances (references).

In some instances, based on the definition of a set of tables that include table instances not having equivalent content, a data package for copying when provisioning of a new system may be created. The defined set may include unique table instances and the data package is with reduced sized and yet including all the necessary data for setting up the new system. Once data in the data package is transferred, the included tables may be replicated in containers based on information from the created hierarchy of metadata tables, for example, based on the generated second metadata table.

Figure 2:
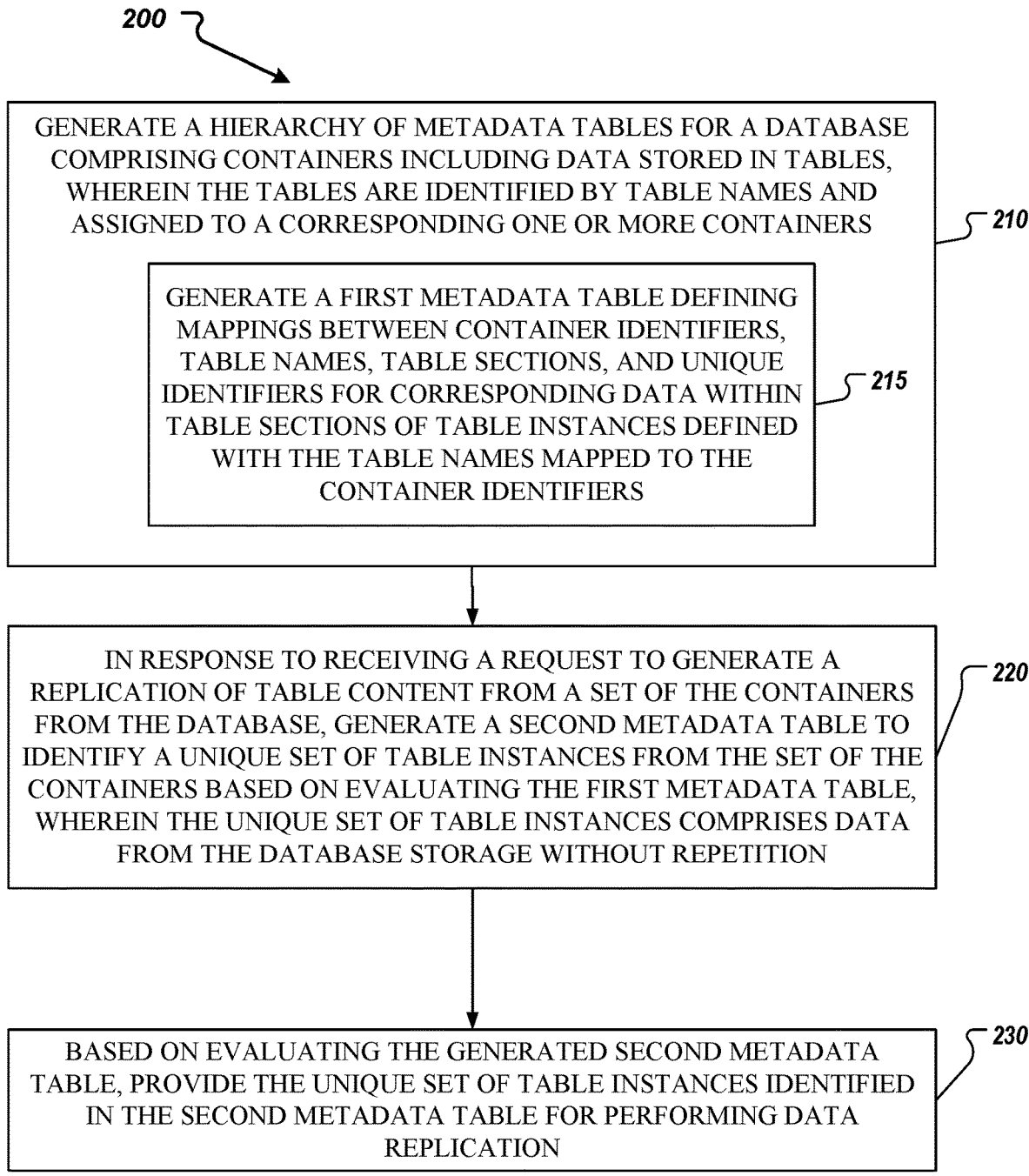
FIG. 2 is a flowchart for an example method for performing data replication from client container storages in accordance with example implementations of the present disclosure.

FIG. 2 is a flowchart for an example method 200 for performing data replication from client container storages in accordance with implementations of the present disclosure. The method 200 may be executed in relation to a database storage, for example, database 110 of FIG. 1 running on a host system, such as host system 104 of FIG. 1.

At 210, a hierarchy of metadata tables for a database is generated. In one example, the database may be database 110 of FIG. 1 and may include containers storing data in tables. The tables may be identified by respective table names and may be assigned to a corresponding one or more containers. A first table may be assigned to two different containers, where two different table instances of the first table are defined for each of the containers, and which store different data. For example, tables may be defined by their size, or a number of rows that are included, and instances of the table may differ in size or rows. Further, tables may be defined to include a set of slices, where a slice of a table corresponds to a unit or portion of data defining a number of rows or a threshold data storage size. Different data content in some of the slices of table instances may be referred by the same table name and may be stored in the different containers.

In some instances, the hierarchy of metadata tables comprises a first metadata table including table metadata tables. The first metadata table defines mappings between container identifiers, table names, table sections, and unique identifiers for corresponding data within table sections of table instances defined with the table names mapped to the container identifiers.

In some instances, generating the first metadata table comprises evaluation of the tables assigned to the different containers in the database. In some instances, table instances associated with corresponding containers from the database are iteratively selected for data evaluation and metadata generation. The data from the table instance may be serialized to calculate a unique content identifier, for example, a checksum. The unique content identifier may uniquely identify all or a portion of the data from a table instance.

For example, the first metadata table may be the metadata table 350 of FIG. 3.

FIG. 3 includes example block diagrams of metadata database tables in accordance with implementations of the present disclosure.

The metadata tables include a metadata table 300 in relation to assigning tables to containers. The metadata table 350 is an example table of the generated first metadata table 215 of FIG. 2. The metadata table 380 is an example table of the generated second metadata table 220 of FIG. 2.

The metadata table 350 is an example table including two record associated with two different containers identified by their container identifier—BACKUP_OCTOBER and BACKUP_NOVEMBER. The table 350 includes a first record mapping the first container to a first table, identified by the table name—USR01. The table 350 includes a second record mapping the second container to a second table, identifier by the same table name—USR01. In this way, the two records identify two instances of tables identified by the same name. The first metadata table includes as further properties a SLICE_ID property and a CHECKSUM property. When tables are indexed in a first metadata table, tables may be divided into slices that define portions of data from a table, e.g. a defined number of rows. In the current example, the first metadata table includes as the first record a reference to a first slice of the table instance with name USR01, i.e., slice with SLICE_ID equal to 1. For the table instance with name USR01 and in relation to slice 1 of that table instance, a checksum value is calculated. The checksum value may be an example unique identifier for the data content at the first slice of the table instance with name USR01 in container BACKUP_OCTOBER. Respectively, the second record of the example table 350 of the first metadata table, identifies a second table instance with name USR01 in container BACKUP_NOVEMBER that has a checksum value that is the same as the checksum value for the first table instance with name USR01 of container BACKUP_OCTOBER.

In some instances, the first metadata table, e.g., the metadata table 300 of FIG. 3, may be generated based on a container metadata table, for example, table 300 of FIG. 3. For example, a record in the first metadata table 300 defined a container by the container identifier, a table by the table name, a size of the table in kilobytes, and a number of rows stored in the corresponding table instance that is referred to in the record. In the example first metadata table 300, there are two records that are associated with two different containers identified by different container identifiers, i.e., BACKUP_OCTOBER and BACKUP_NOVEMBER, where both containers include corresponding table instances with the same table name—USR01.

As presented in table 300, the size of the two table instance in the two containers is the same and the number of rows in the table instances are the same. However, based on this information it may not be determined whether the data content of the tables is equivalent. Therefore, if a global back-up is to be performed that includes all containers associated, for example, with backup for every month of the current year, then both table instances has to be copied for the global backup. If these two tables instances include equivalent data content, the replication of the two instances for the sake of the global backup may be obsolete, and just a single copy of one of the instances of the tables in table name USR01 would be sufficient for storing all the information relevant for a backup.

At 220, in response to receiving a request to generate a replication of table content from a set of the containers from the database, a second metadata table is generated, where the second metadata table identifies a unique set of table instances from the set of the containers is identified.

In some instances, the received request to generate the replication of table content from the set of the containers from the database is in relation to a client identified with a client identifier. The received request for replication of content from the set of containers of the database may be related to a particular client and/or product. In some instances, the metadata at the first metadata table as generated at 215 may be filtered to provide information for table instances only from the relevant containers for the received request.

The second metadata table is a metadata table generated based on evaluating the first metadata table, where the unique set of table instances include data from the database storage without repetition. The second metadata table may include metadata for tables included in containers identified as associated with the client identifier. The second metadata table may define attributes to organize metadata in relation to different portions of table instances in the containers of the database storage.

In the example of FIG. 3, the received requests may be determined as related backups containers stored in the database storage, including BACKUP_OCTOBER and BACKUP_NOVEMBER. Therefore, both records stored at table 350 are relevant for the received request. Then, a second metadata table may be generated that can define the relevant table instances for performing the replication. For example, the second metadata table may be table 380 of FIG. 3. The table 380 is generated based on the first metadata table, which is table 350 of FIG. 1. The table 380 include attributes including a table name, a checksum, number of references, and data attributes.

In some instances, generating the second metadata table includes determining whether records in the second metadata table that are associated with the same table names are mapped to the same unique identifiers (e.g., based on the checksum or other unique identifier) for the portions of the data corresponding to the table names. In the example of FIG. 3, there are two table instances with the same table name—USR01 that are mapped to the same unique identifier (e.g. checksum) having the same value—ABCDEF.

A determination that two table instances identified by a single table name (e.g., USR02 and not shown) include different data may occur when it is determined that two records in the second metadata table, which otherwise are associated with the same table name, include different unique identifiers (e.g., XYZ and BXZ) for at least one table section (e.g. identified by the same slice identifier, e.g., 1) corresponding to the two table instances.

In some instances, generating the second metadata table includes storing records in the second metadata table that define mappings between a table name, a unique identifier for data content at a table instance with the table name, and a number of occurrences of the data content associated with the unique identifier. The number of occurrences of the data content associated with the same unique identifier at the set of the containers associated with the received request may be determined based on the records associated with the table instances having the same unique content identifier (e.g., checksum).

In some instances, the generated unique content identifier may be not only a checksum, but a hash value or another value that may be used to uniquely distinguish table content data. For example, in an implementation scenario where the hierarchy of metadata tables may be used in a copy operation between databases, instead of a checksum, a globally unique identifier (GUID) may be generated that is independent from the table data. An advantage of the GUID may be a higher performance in the generation of the data for the metadata table as the GUID is not related to the data at all. In this case, we may not use the advantage of the checksum to avoid duplicate data as the data is to be stored in the containers only temporary.

In some instances, a GUID may be generated for each table or table slice to uniquely identify the table or table slice. Generation of GUIDs may be much faster compared to building a checksum. In a use case of performing a copy procedure for tables from one or more containers associated with performing a copy procedure, only a generated GUID may be used to identify the tables relevant for performing the copy.

For example, an example first metadata table—Table 1 below—may include both checksum data and GUID data. Based on such example first metadata table, a second metadata table, such as Table 2, may be generated.

TABLE 1

| FIRST METADATA TABLE EXAMPLE | | |
|---|---|---|
| CONTAINER | TABNAME | DATAKEY |
| PERMANENT_BACKUP_JAN | TAB_A | <Checksum: ABC> |
| PERMANENT_BACKUP_FEB | TAB_A | <Checksum: ABC> |
| PERMANENT_BACKUP_MAR | TAB_A | <Checksum: ABC> |
| REMOTE_CLIENTCOPY | TAB_A | <Generated GUID: QWERTZ> |

TABLE 2

SECOND METADATA TABLE EXAMPLE

| TABNAME | DATAKEY | NUMBER_OF_REFERENCES | RAWDATA |
|---|---|---|---|
| TAB_A | ABC | 3 | <Table Data: AAA> |
| TAB_A | QWERTZ | 1 | <Table Data: AAA> |

In the example Table 1, the fields -container, tabname, and datakey—may be defined as key fields. In the example Table 2, the fields—tabname and datakey—may be defined as key fields. According to this example, table with name TAB_A is stored in 3 backup-containers in the first metadata table. But the data is only stored once in the second metadata table as the checksum is the same for all three backups. In this case, the table records did not change and therefore the table checksum remained the same. Furthermore, for container "REMOTE_CLIENTCOPY" that may be associated with performing a remote client copy, table Tab A is stored as well. Although the table data in Tab A in container REMOTE_CLIENTCOPY may be the same, the data is stored in a separate record in the second metadata table. In this case, the container REMOTE_CLIENTCOPY is associated with data that is only kept temporary during the table TAB_A is copied. Once a copy procedure is performed, the table TAB_A may be deleted from the database while the other backup containers still remaining in the database. As the TAB_A table in the REMOTE_CLIENTCOPY container is a temporary data using a GUID rather than using a checksum and calculating the checksum is an easier, faster, and cheaper way to relate data between the first and the second metadata table and thus resource spending is improved.

In some instances, a first record and a second record in the second metadata table identify a first table name for a table, when table instances corresponding to the first table name include different data in different containers. For example, table 380 is an example of the second metadata table include two records, including the same table name that correspond to table instances assigned to two different containers. This is the case when the first table name is stored in at least two records at the first metadata table (e.g. table 350 of FIG. 3) and is associated with different unique identifiers (such record are not shown on FIG. 3) at corresponding records in the first metadata table.

At 230, based on evaluating the generated second metadata table, the unique set of table instances identified in the second metadata table are provided for performing data replication.

In some instances, table instances associated with containers related to the received request at 220, may be identified at the second metadata table. The second metadata table stored only once database tables, even though they may be used in multiple containers, when they have the same content as determined based on the unique content identifier.

In the example of FIG. 3, as there are two instances of a table with table name USR01 and they are mapped to the same checksum, then only one instance of the table instances with name USR01 is identified in the second metadata table, as shown in table 380 of FIG. 3. This is because it is not necessary to replicate all content of containers BACKUP_OCTOBER and BACKUP_NOVEMBER, as they have a table instance assigned to both of them that includes equivalent data. Therefore, when a data replication is performed for content from a set of containers, the data replication may be performed based on the identified table instances in the second metadata table, rather than replication of the content of the containers as maintained with the assigned tables.

In some instances, the generation of the hierarchy of metadata tables may also include generating a third metadata table defining mappings between container identifiers and table names, such as table 300 of FIG. 3. The generated hierarchy may also include a fourth metadata table identifying quantity of tables and table size in relation to the containers.

For example, the generated hierarchy may include a table header metadata table, that may include as attributes CONTAINER_ID, NUMBER_OF_TABLES, SIZE_IN_KBYTES. Such a table header metadata table defines a header for a container. The table header metadata table may store the number of tables stored in a container and shows a number of tables in the container.

Figure 4:
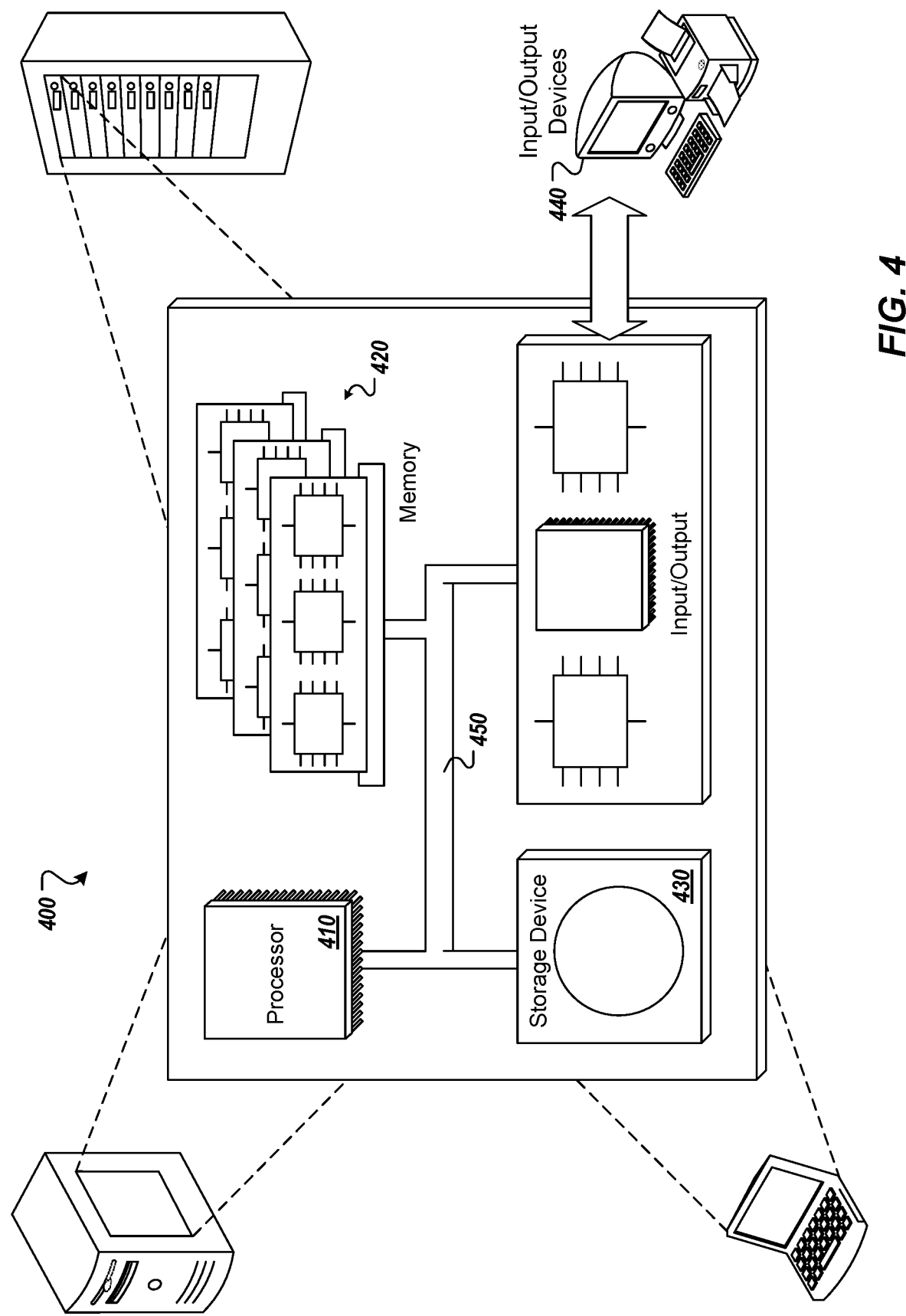
FIG. 4 is a schematic illustration of example computer systems that can be used to execute example implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device, such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication, such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method, the method comprising:
    generating a hierarchy of metadata tables for a database comprising containers, wherein the containers include data stored in tables, wherein the tables are identified by table names and a first table of the tables is assigned to two corresponding containers, wherein two table instances of the first table are correspondingly stored at respective ones of the two containers, wherein the two table instances store overlapping data in the two containers, wherein the metadata tables of the generated hierarchy includes metadata for table instances stored in the containers of the database, wherein generating the hierarchy of metadata tables comprises:
        generating a first metadata table defining mappings between container identifiers, table names, table sections, and unique identifiers for corresponding data within table sections of table instances defined with the table names mapped to the container identifiers;
        generating a third metadata table defining mappings between container identifiers and table names; and
        generating a fourth metadata table identifying quantity of tables and table size in relation to the containers;
    in response to receiving a request to generate a replication of table content from the two containers from the database, generating a second metadata table to identify a unique set of table instances from the two containers based on evaluating the first metadata table, wherein the unique set of table instances identifies only one of the two table instances stored at the two containers; and
    based on evaluating the generated second metadata table, providing the unique set of table instances identified in the second metadata table for performing data replication.

2. The method of claim 1, wherein generating the first metadata table comprises:
    selecting a table instance associated with a container from the containers of the database;
    serializing table data from the table instance to calculate a checksum to uniquely identify a portion of the table data from the table instance; and
    defining the unique identifiers for the data corresponding to the table sections in accordance with calculated checksums.

3. The method of claim 1, wherein generating the second metadata table comprises:
    determining whether records in the second metadata table associated with same table names are mapped to the same unique identifiers for portions of the data corresponding to the table names; and
    determining that two table instances identified by a single table name include different data when determining two records in the second metadata table include different unique identifiers for at least one table section corresponding to the two table instances.

4. The method of claim 1, wherein generating the second metadata table comprises:
storing records in the second metadata table that define mappings between a table name, a unique identifier for data content at a table instance with the table name, and a number of occurrences of the data content associated with the unique identifier, wherein the number of occurrences of the data content is determined within table instances at the set of the containers associated with the received request.

5. The method of claim 4, wherein a first record and a second record in the second metadata table identify a first table name for a table from the tables in the database, when table instances corresponding to the first table name include different data in different containers to which they are assigned, and wherein the first table name is stored in at least two records at the first metadata table including different unique identifiers.

6. The method of claim 1, wherein the received request to generate the replication of table content from the set of the containers from the database is in relation to a client identified with a client identifier, and wherein the second metadata table includes metadata for tables included in containers identified as associated with the client identifier.

7. The method of claim 1, wherein the first metadata table identifies a temporary table instance of the first table associated with a container for storing temporary data, wherein the first metadata table identifies one or more sections of the temporary table instance with global unique identifiers as unique identifiers, and wherein when the second metadata table is generated the temporary table instance is stored as a separate record to identify the temporary table instance without evaluating data from the first metadata table.

8. A non-transitory, computer-readable medium coupled to one or more processors and having instructions stored thereon which, when executed by the one or more processors, cause the one or more processors to perform operations, the operations comprising:
generating a hierarchy of metadata tables for a database comprising containers, wherein the containers include data stored in tables, wherein the tables are identified by table names and a first table of the tables is assigned to two corresponding containers, wherein two table instances of the first table are correspondingly stored at respective ones of the two containers, wherein the two table instances store overlapping data in the two containers, wherein the metadata tables of the generated hierarchy includes metadata for table instances stored in the containers of the database, wherein generating the hierarchy of metadata tables comprises:
generating a first metadata table defining mappings between container identifiers, table names, table sections, and unique identifiers for corresponding data within table sections of table instances defined with the table names mapped to the container identifiers;
generating a third metadata table defining mappings between container identifiers and table names; and
generating a fourth metadata table identifying quantity of tables and table size in relation to the containers;
in response to receiving a request to generate a replication of table content from the two containers from the database, generating a second metadata table to identify a unique set of table instances from the two containers based on evaluating the first metadata table, wherein the unique set of table instances identifies only one of the two table instances stored at the two containers; and
based on evaluating the generated second metadata table, providing the unique set of table instances identified in the second metadata table for performing data replication.

9. The computer-readable medium of claim 8, wherein generating the first metadata table comprises:
selecting a table instance associated with a container from the containers of the database;
serializing table data from the table instance to calculate a checksum to uniquely identify a portion of the table data from the table instance; and
defining the unique identifiers for the data corresponding to the table sections in accordance with calculated checksums.

10. The computer-readable medium of claim 8, wherein generating the second metadata table comprises:
determining whether records in the second metadata table associated with same table names are mapped to the same unique identifiers for portions of the data corresponding to the table names; and
determining that two table instances identified by a single table name include different data when determining two records in the second metadata table include different unique identifiers for at least one table section corresponding to the two table instances.

11. The computer-readable medium of claim 8, wherein generating the second metadata table comprises:
storing records in the second metadata table that define mappings between a table name, a unique identifier for data content at a table instance with the table name, and a number of occurrences of the data content associated with the unique identifier, wherein the number of occurrences of the data content is determined within table instances at the set of the containers associated with the received request.

12. The computer-readable medium of claim 8, wherein a first record and a second record in the second metadata table identify a first table name for a table from the tables in the database, when table instances corresponding to the first table name include different data in different containers to which they are assigned, and wherein the first table name is stored in at least two records at the first metadata table including different unique identifiers.

13. The computer-readable medium of claim 8, wherein the received request to generate the replication of table content from the set of the containers from the database is in relation to a client identified with a client identifier, and wherein the second metadata table includes metadata for tables included in containers identified as associated with the client identifier.

14. The computer-readable medium of claim 8, wherein the first metadata table identifies a temporary table instance of the first table associated with a container for storing temporary data, wherein the first metadata table identifies one or more sections of the temporary table instance with global unique identifiers as unique identifiers, and wherein when the second metadata table is generated the temporary table instance is stored as a separate record to identify the temporary table instance without evaluating data from the first metadata table.

15. A system comprising
a computing device; and
a non-transitory computer-readable storage device coupled to the computing device and having instructions stored thereon which, when executed by the computing device, cause the computing device to perform operations, the operations comprising:

generating a hierarchy of metadata tables for a database comprising containers, wherein the containers include data stored in tables, wherein the tables are identified by table names and a first table of the tables is assigned to two corresponding containers, wherein two table instances of the first table are correspondingly stored at respective ones of the two containers, wherein the two table instances store overlapping data in the two containers, wherein the metadata tables of the generated hierarchy includes metadata for table instances stored in the containers of the database, wherein generating the hierarchy of metadata tables comprises:
  generating a first metadata table defining mappings between container identifiers, table names, table sections, and unique identifiers for corresponding data within table sections of table instances defined with the table names mapped to the container identifiers;
  generating a third metadata table defining mappings between container identifiers and table names; and
  generating a fourth metadata table identifying quantity of tables and table size in relation to the containers;
in response to receiving a request to generate a replication of table content from the two containers from the database, generating a second metadata table to identify a unique set of table instances from the two containers based on evaluating the first metadata table, wherein the unique set of table instances identifies only one of the two table instances stored at the two containers; and
based on evaluating the generated second metadata table, providing the unique set of table instances identified in the second metadata table for performing data replication.

16. The system of claim 15, wherein generating the first metadata table comprises:
  selecting a table instance associated with a container from the containers of the database;
  serializing table data from the table instance to calculate a checksum to uniquely identify a portion of the table data from the table instance; and
  defining the unique identifiers for the data corresponding to the table sections in accordance with calculated checksums.

17. The system of claim 15, wherein generating the second metadata table comprises:
  determining whether records in the second metadata table associated with same table names are mapped to the same unique identifiers for portions of the data corresponding to the table names; and
  determining that two table instances identified by a single table name include different data when determining two records in the second metadata table include different unique identifiers for at least one table section corresponding to the two table instances.

18. The system of claim 15, wherein generating the second metadata table comprises:
  storing records in the second metadata table that define mappings between a table name, a unique identifier for data content at a table instance with the table name, and a number of occurrences of the data content associated with the unique identifier, wherein the number of occurrences of the data content is determined within table instances at the set of the containers associated with the received request,
  wherein a first record and a second record in the second metadata table identify a first table name for a table from the tables in the database, when table instances corresponding to the first table name include different data in different containers to which they are assigned, and wherein the first table name is stored in at least two records at the first metadata table including different unique identifiers.

19. The system of claim 15, wherein the first metadata table identifies a temporary table instance of the first table associated with a container for storing temporary data, wherein the first metadata table identifies one or more sections of the temporary table instance with global unique identifiers as unique identifiers, and wherein when the second metadata table is generated the temporary table instance is stored as a separate record to identify the temporary table instance without evaluating data from the first metadata table.

* * * * *